United States Patent [19]

Drafahl, Jr.

[11] 4,218,122
[45] Aug. 19, 1980

[54] LIGHT-HANDLE

[76] Inventor: Jack W. Drafahl, Jr., 5572 Nelson, Cypress, Calif. 90360

[21] Appl. No.: 62,238

[22] Filed: Jul. 30, 1979

[51] Int. Cl.³ .............................................. G03B 17/00
[52] U.S. Cl. .................................. 354/293; 354/64; 354/81; 354/129; 354/145
[58] Field of Search ............... 354/81, 82, 64, 126, 354/129, 145, 293, 132

[56] References Cited

U.S. PATENT DOCUMENTS

| | | | |
|---|---|---|---|
| 3,074,338 | 1/1963 | Hanscom | 354/293 X |
| 3,458,696 | 7/1969 | Kapteyn et al. | 354/126 |
| 3,738,248 | 6/1973 | Fish et al. | 354/64 |
| 3,852,790 | 12/1974 | Robinson | 354/126 |
| 3,858,228 | 12/1974 | Mito | 354/293 |
| 4,068,245 | 1/1978 | Ohtaki et al. | 354/145 X |

FOREIGN PATENT DOCUMENTS 1389579  4/1975  United Kingdom .................. 354/293

Primary Examiner—Richard A. Wintercorn
Attorney, Agent, or Firm—Allen A. Dicke, Jr.

[57] ABSTRACT

Unitary light-handle structure attaches to underwater camera to serve as a properly directed strobe light source structure for the camera and as a handle structure by which the camera can be pointed and controlled. The handle contains the strobe light source, as well as its charging and firing electronics and its power supply batteries.

10 Claims, 5 Drawing Figures

LIGHT-HANDLE

BACKGROUND

This invention is directed to a handle structure which is attachable to a camera for its directing and also contains stroboscopic lighting equipment, the entire structure being particularly suitable for underwater usage.

There is one widely accepted camera which is especially adapted for direct underwater usage, and that camera has a water-proof receptacle from which stroboscopic light firing signals are received. Furthermore, there are housings for a wide variety of cameras, and each of these is provided with a stroboscopic light synchronization signal receptacle. In order to provide light for the underwater photography, a wide variety of stroboscopic lights are offered. These are mounted on a camera bracket, often with flexible arms. The camera bracket sometimes also carries other equipment such as meters, handles, viewfinders, and the like. Such devices are usually quite large and cumbersome and are difficult or impossible to handle with one hand or in small spaces.

The flexible support of the strobe light is intended to permit it to be directed precisely where the light is required for proper photography. However, with such flexibility, quite often the light is bumped and is not properly directed with the consequence of poorly lighted pictures or the need for underwater adjustment of the flexible structure. Such is undesirable and difficult to manage.

SUMMARY

In order to aid in the understanding of this invention, it can be stated in summary that it is directed to a light-handle structure for attachment to a camera and is of waterproof construction. It is configured for ease of grip and pointing of the camera and for direction of light onto a subject for accurate picture taking.

It is an object of this invention to provide a structure which is for connection to an underwater camera and which supplies both the camera handle function and the scene lighting function for underwater photography. It is another object to provide an underwater lighting structure wherein the stroboscopic light is fixedly directed toward the subject position so that no light-directing adjustment is necessary. It is another object to provide a handle structure for directing the underwater camera so that it points at the subject and for containing the strobe light equipment. It is a further object to provide a light-handle structure for underwater photography which is convenient, compact and of proper size and shape to provide both the camera holding and pointing requirements and the subject matter lighting requirements.

Other objects and advantages of this invention will become apparent from a study of the following portion of the specification, the claims and the attached drawings.

DESCRIPTION OF THE PREFERRED EMBODIMENT

Figure 1:
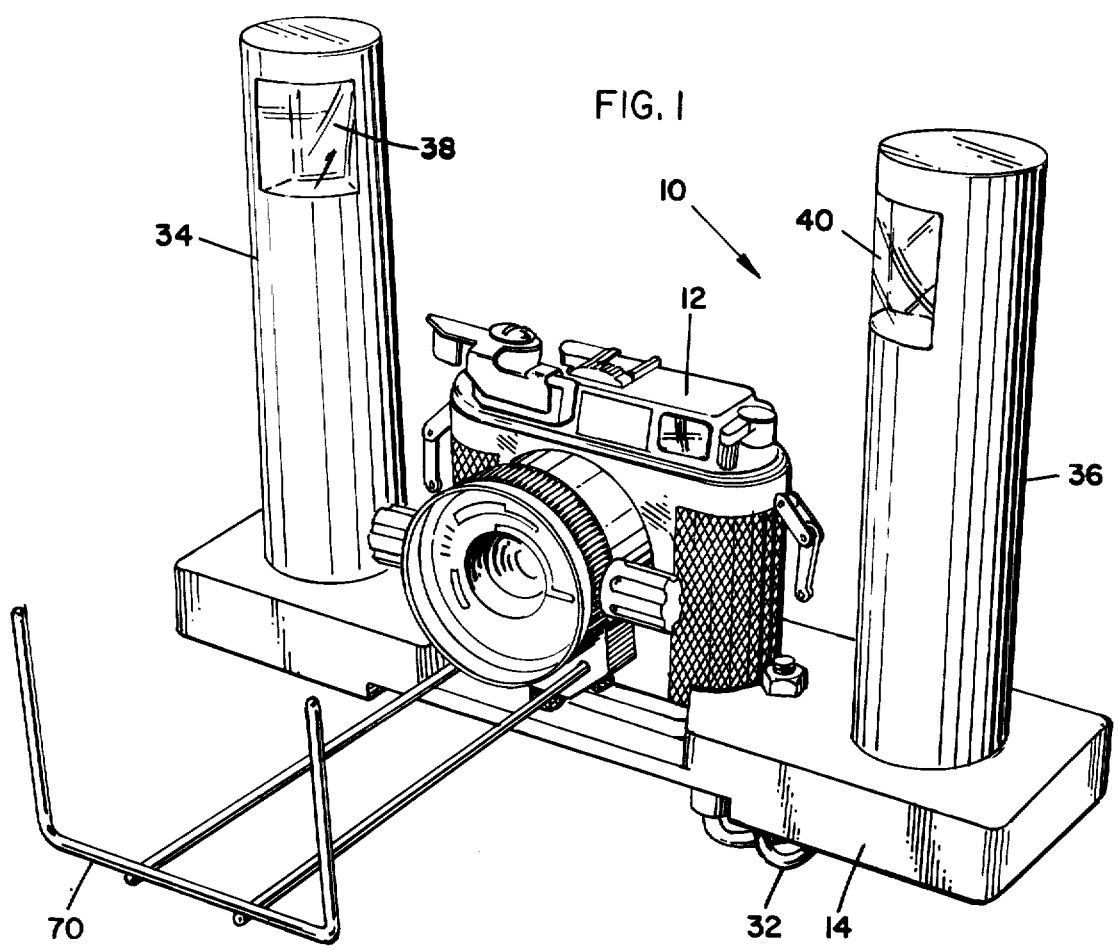
FIG. 1 is a perspective view of the light-handle structure of this invention, showing a camera mounted thereon.
Figure 2:
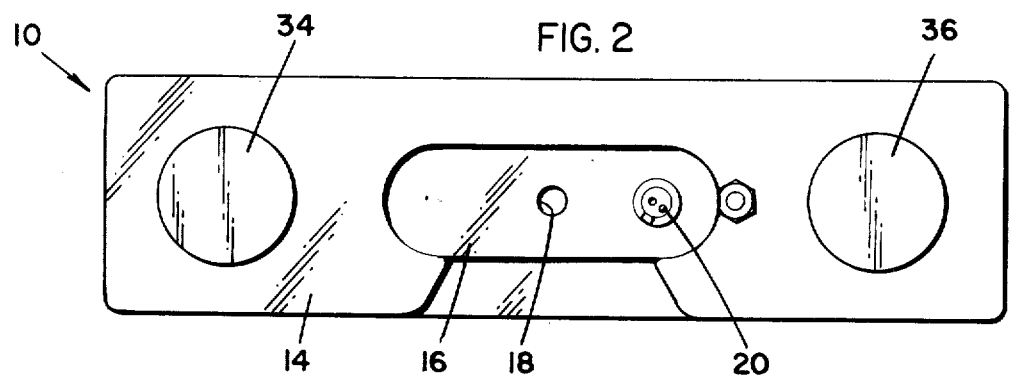
FIG. 2 is a plan view of the light-handle structure.
Figure 3:
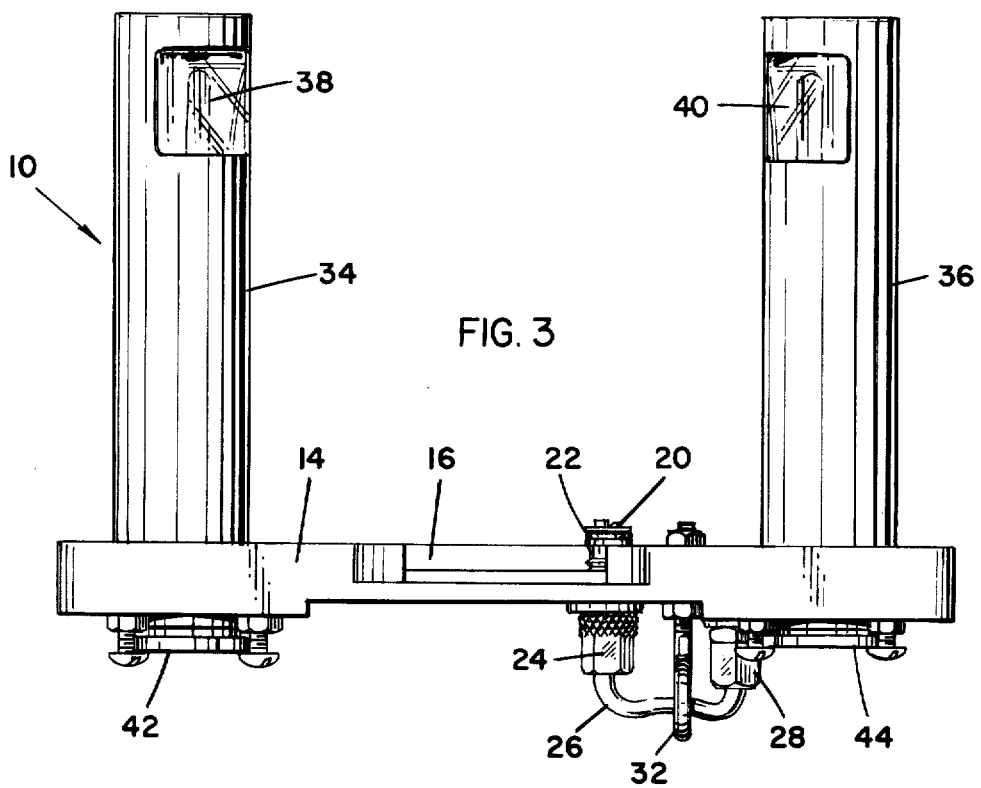
FIG. 3 is a front-elevational view thereof.

The light-handle structure of this invention is generally indicated at 10 in FIGS. 1, 2 and 3. The structure 10 is a device to which a camera 12 can be fastened to supply both the handle function for the camera and the lighting function for photography by the camera. Crossbar 14 is slightly larger in the front-to-back direction than the body of camera 12, and crossbar 14 has socket or recess 16 therein to receive the bottom of the camera. Screw opening 18 extends through crossbar 14 near the center of recess 16 so that a camera lockscrew can extend upward from the bottom of the crossbar through screw opening 18 and engage in the camera. Such a camera lockscrew locks the camera down into recess 16 of crossbar 14. In this way, crossbar 14 is firmly mounted under the camera.

Camera 12 has a socket in the bottom thereof which is a synchronization socket from which is transmitted a signal for the firing of stroboscopic illumination. Plug 20 is mounted to extend upward in recess 16 to be received in the socket in the camera bottom. Screwthreads are provided so that plug 20 can be screwed into place in the synchronization socket in the camera bottom. O-ring 22 seals against the walls in that synchronization socket to prevent water entry to the contact point. Plug 20 is part of the connector 24 which connects into, is secured into, is waterproof in, and makes contact in the camera. Synchronization cable 26 extends from connector 24 and enters crossbar 14 through seal 28. Seal 28 is in the form of a fitting which is screwed into crossbar 14 and thus seals around its own threads and has an exterior nut which crimps a ferrule onto synchronization cable 26 to provide cable sealing. At its inner end, seal 28 is open to the interior passage 30 extending through the crossbar.

Guard 32 is an eyebolt structure extending downward below the bottom of crossbar 14 and positioned to protect connector 24 and seal 28 as well as the interconnecting synchronization cable 26. In addition to protecting these components from damage from inadvertent impact, guard 32 serves as a loop onto which a lanyard can be secured. Guard 32 has one upstanding bolt leg which passes through crossbar 14. Nuts are threaded onto the leg of the guard both above and below the crossbar in order to secure the guard in place.

Posts 34 and 36 extend upwardly from the top of crossbar 14 adjacent the ends thereof outboard of camera recess 16. As seen in FIG. 1, the posts are sufficiently separated so that, when camera 12 is positioned in the camera recess 16, the posts can be grasped with sufficient room between each post in the camera that the fingers can extend therebetween. However, at least post 34 is sufficiently close to the camera that, when post 34 is grasped in the right hand, one finger or the thumb can reach the shutter release on the camera. Thus, posts 34 and 36 act as handles by which the structure 10 can be grasped so that camera 12 can be pointed.

Figure 5:
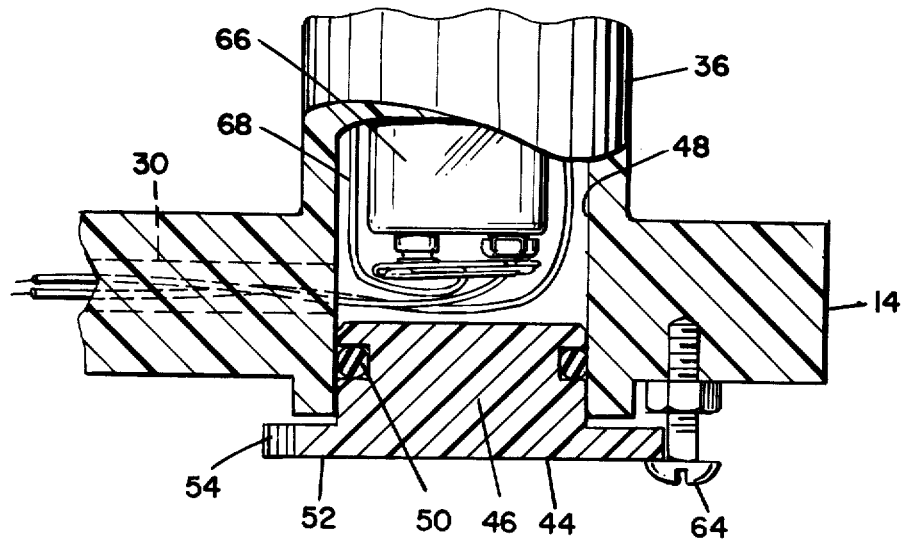
FIG. 5 is an enlarged section taken generally along the line 5—5 of FIG. 4, with parts broken away and parts taken in section.
Figure 4:
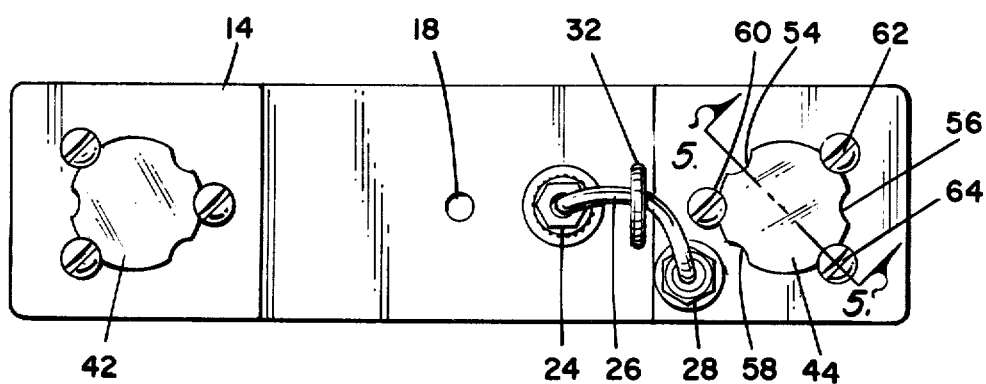
FIG. 4 is a bottom view thereof.

Posts 34 and 36 are tubular with closed top and bottom and contain therein flash units. The flash tubes of the flash units are respectively positioned behind windows 38 and 40 in the posts. The bottoms of the posts 34 and 36 are open through crossbar 14 for access thereto. Caps 42 and 44 respectively close the tubular bottom openings of the posts. FIGS. 4 and 5 show the details of cap 44, which is described in detail below. Cap 42 is sealed into, secured with respect to, and releaseable from the lower end of post 34 in the same way.

Cap 44 has cylindrical body 46 which extends into the tubular opening 48 in post 36 and is sealed with respect thereto by means of O-ring 50. Circular flange 52 has three notches 54, 56 and 58 cut therein with notch 56 lying on the center line between posts 34 and 36 and with notches 54 and 58 each lying 45 degrees from that center line. Headed screws 60, 62 and 64 are threaded into the bottom of crossbar 14 around tubular opening 48. Screw 60 is on the center line, and screws 62 and 64 are each 45 degrees from the center line. With cap 44 oriented as shown, the heads of the screws engage under flange 52 to hold the cap in place, see FIG. 5. When the cap is turned 180 degrees, notches 54, 56 and 58 respectively align with screws 64, 60 and 62 so that the cap can be removed for access to the interior.

In the interior of the posts, in addition to the flash tubes, are batteries such as battery 66, interconnection wiring such as wiring 68 which interconnects the two flash units in the two posts and which receives the synchronization signal from the camera and which supplies battery power to the flash electronics and triggers the flash electronics. A switch may be provided to conserve battery power when flash is not needed. All of the electronics is fully sealed in the two posts and passage 30. In addition to the removably installed closure caps 42 and 44 in the bottom of the posts, the tubular posts are permanently closed at the top.

With camera 12 in place and with connector 24 tightened into the camera, the camera is ready for the taking of pictures. It is clear that the entire structure is waterproof, including the special camera 12, so that the light-handle structure 10 and the system including camera 12 is especially useful for underwater photography. In underwater photography, closeups are usually taken, and framing guide 70 is employed to show the focal distance and picture size for a particular lens installation. Windows 38 and 40 and the flash tubes therein are arranged to illuminate the area defined by framing guide 70. However, the windows and flash tubes are arranged so that they also illuminate the other areas and distances generally employed in underwater and similar photography. The illumination is provided and directed with the same structure that holds and points the camera for convenient and accurate pointing, even with one hand. Thus, reliable illumination is provided in the structure which also provides for pointing of the illumination and the camera supported on the crossbar, with the camera close enough to the handle to also permit camera actuation to permit one-hand operation.

This invention has been described in its presently contemplated best mode, and it is clear that it is susceptible to numerous modifications, modes and embodiments within the ability of those skilled in the art and without the exercise of the inventive faculty. Accordingly, the scope of this invention is defined by the scope of the following claims.

What is claimed is:

1. A structure for providing camera support, photographic illumination and manual graspability for pointing the camera and the illumination for use in underwater environment comprising:
    a crossbar, said crossbar being for supporting a camera thereon and for securement of a camera thereon, a synchronization connector on said crossbar for connection into a camera on said crossbar;
    a post on said crossbar, said post having a stroboscopic light tube therein and having a window therein for permitting stroboscopic light to be emitted from said window, electrical connection between said synchronization camera connector and said stroboscopic light tube so that, upon demand by the camera, said stroboscopic light is fired, said post being rigidly secured on said crossbar and being sized for manual grasp, said post being positioned with respect to the camera so that, when said post is grasped in the hand, a finger can reach the camera for firing the camera.

2. The structure of claim 1 wherein said post is a cylindrical tube having a first closed end and a second closed end, with a removable plug closing said second closed end.

3. The structure of claim 2 wherein said removable plug is sealed in said tube.

4. The structure of claim 3 wherein said plug has a flange thereon and said plug can be rotated in said tube, a restraining head positioned adjacent said flange and engaging over said flange, said flange having a notch therein so that said flange can be rotated with said notch adjacent said retaining head so that said plug can be removed.

5. The structure of claim 4 wherein there is a plurality of restraining heads positioned around said flange and a plurality of corresponding notches in said flange.

6. The structure of claim 5 wherein there is a plurality of posts rigidly mounted on said crossbar to provide a plurality of stroboscopic light tubes and at least two graspable posts.

7. The structure of claim 1 wherein there is a plurality of posts rigidly mounted on said crossbar to provide a plurality of stroboscopic light tubes and at least two graspable posts.

8. The structure of claim 7 wherein said connector on said bar for connection to the camera is a plug for plugging into the camera and there is a connector associated with said plug for securing said plug into the camera, a guard secured adjacent said connector for protecting said connector against impact damage.

9. The structure of claim 8 wherein said guard is eye-shaped so that a lanyard may be attached thereto.

10. The structure of claim 9 wherein there is a recess in said crossbar for partially receiving a camera for rigid positioning of the camera.

* * * * *